July 17, 1956

M. E. GLUHAREFF 2,755,038

HELICOPTER-AIRPLANE WITH ENGINES
MOUNTED ON FIXED WINGS

Filed Oct. 21, 1952

Inventor
MICHAEL E. GLUHAREFF

By M. B. Tasker

Attorney

July 17, 1956

M. E. GLUHAREFF 2,755,038

HELICOPTER-AIRPLANE WITH ENGINES
MOUNTED ON FIXED WINGS

Filed Oct. 21, 1952

Inventor
MICHAEL E. GLUHAREFF

By M. B. Tasker

Attorney

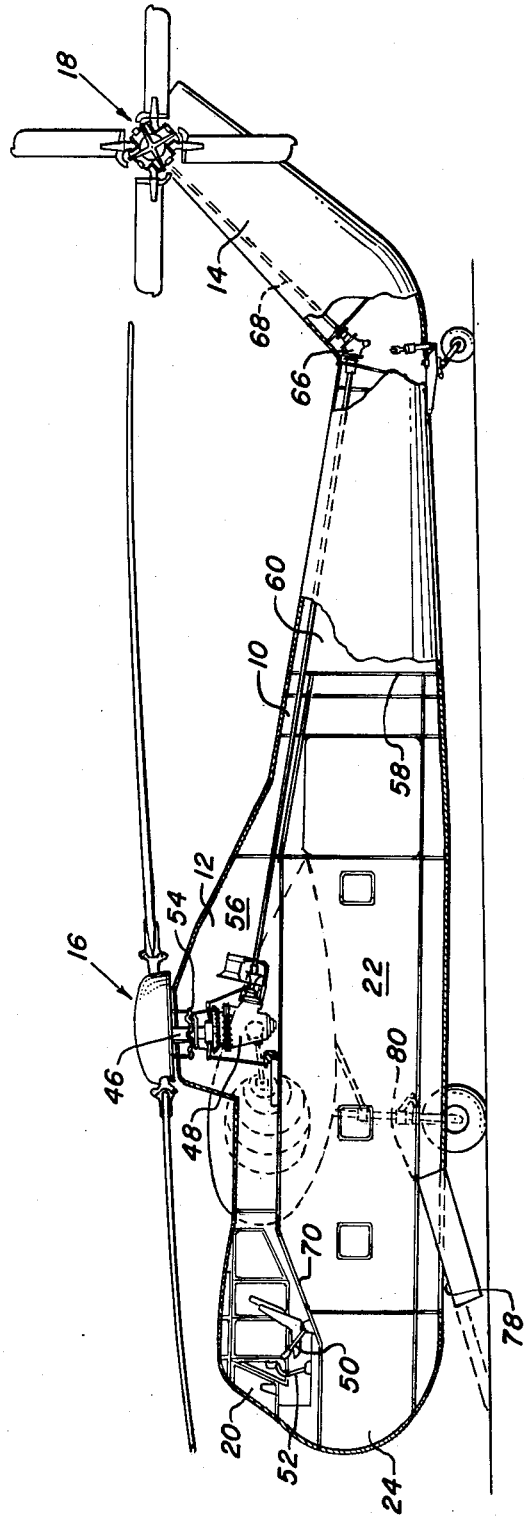

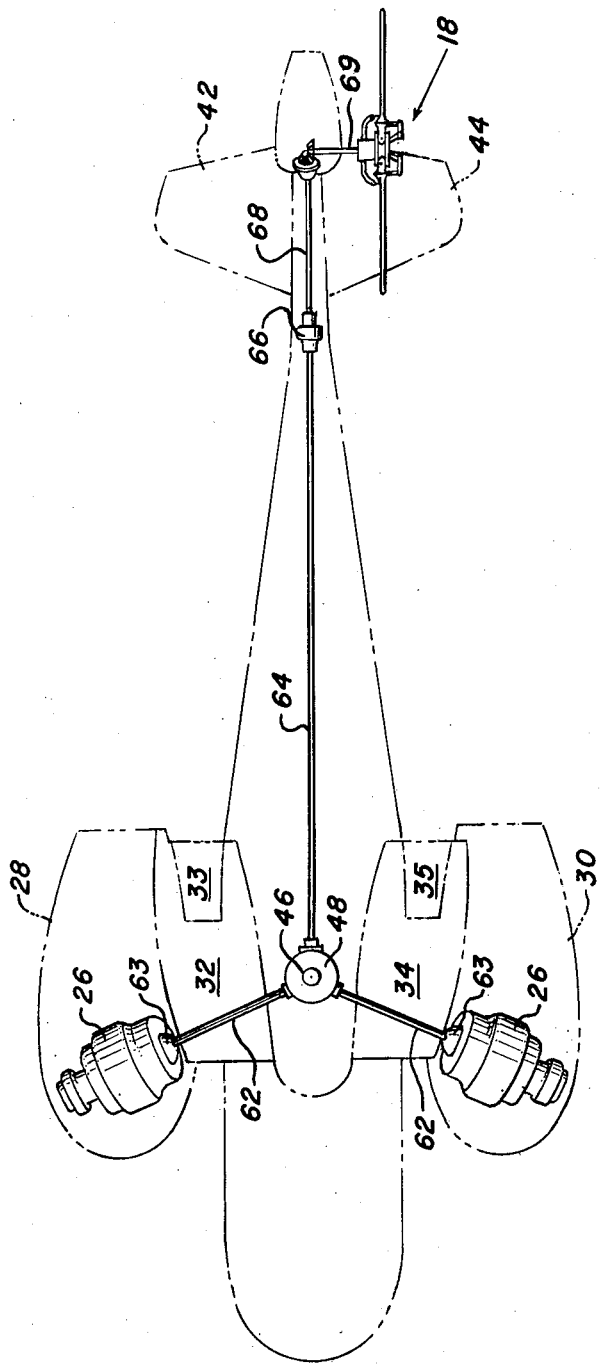

United States Patent Office 2,755,038
Patented July 17, 1956

2,755,038

HELICOPTER-AIRPLANE WITH ENGINES MOUNTED ON FIXED WINGS

Michael E. Gluhareff, Bridgeport, Conn., assignor to United Aircraft Corporation, East Hartford, Conn., a corporation of Delaware Application October 21, 1952, Serial No. 315,981

10 Claims. (Cl. 244—6)

This invention relates to rotary wing aircraft and particularly to helicopters of the type which have an elongated fuselage with a main sustaining rotor mounted directly above the fuselage.

An object of the invention is to provide a helicopter of this type in which the fuselage provides an unobstructed cargo compartment which extends well aft in the fuselage from the nose of the fuselage.

A further object of the invention is to provide an improved helicopter of this type in which the engines for driving the rotor are located outboard of the fuselage.

A still further object of the invention is the provision for an improved arrangement for the mechanism for transmitting power to the rotor relative to the pilot and cargo compartments.

A yet further object of the invention is generally to improve rotary wing aircraft.

These and other objects and advantages of the invention will be evident or will be pointed out in connection with the following detailed description of the drawings in which one embodiment of the invention is illustrated.

In these drawings:

Fig. 5 is a side elevation on an enlarged scale with parts of the fuselage broken away.

Fig. 6 is a plan view showing the layout of the engines and the mechanism for transmitting power to the rotors, the helicopter being shown in phantom lines.

Referring to Figs. 1 to 4, the helicopter embodying the invention comprises essentially an elongated fuselage 10 having a main rotor pylon 12 and a tail rotor pylon 14 on which are mounted the main rotor generally indicated at 16 and the tail rotor generally indicated at 18.

Figure 4:
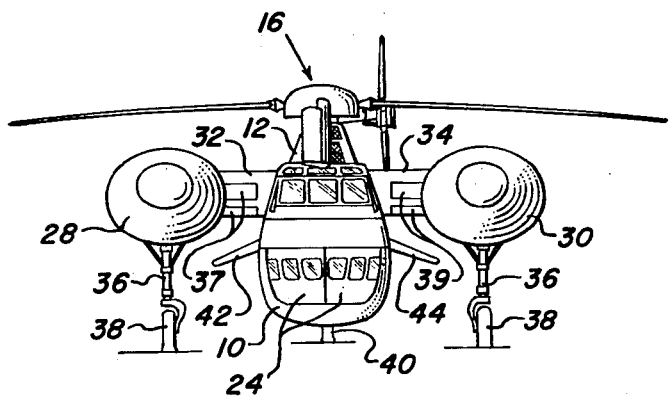
Fig. 4 is a front view.

The fuselage has a pilot compartment 20 ahead of the main rotor pylon 12, which is located in the upper part of the nose section of the fuselage. The space beneath the pilot compartment extends well aft beneath the main rotor pylon and comprises the main cargo or passenger compartment 22 of the ship, as shown in Fig. 5. Access to the cargo compartment is gained through a pair of clamshell doors 24 in the nose of the fuselage as is best shown in Figs. 2 and 4.

Figure 1:
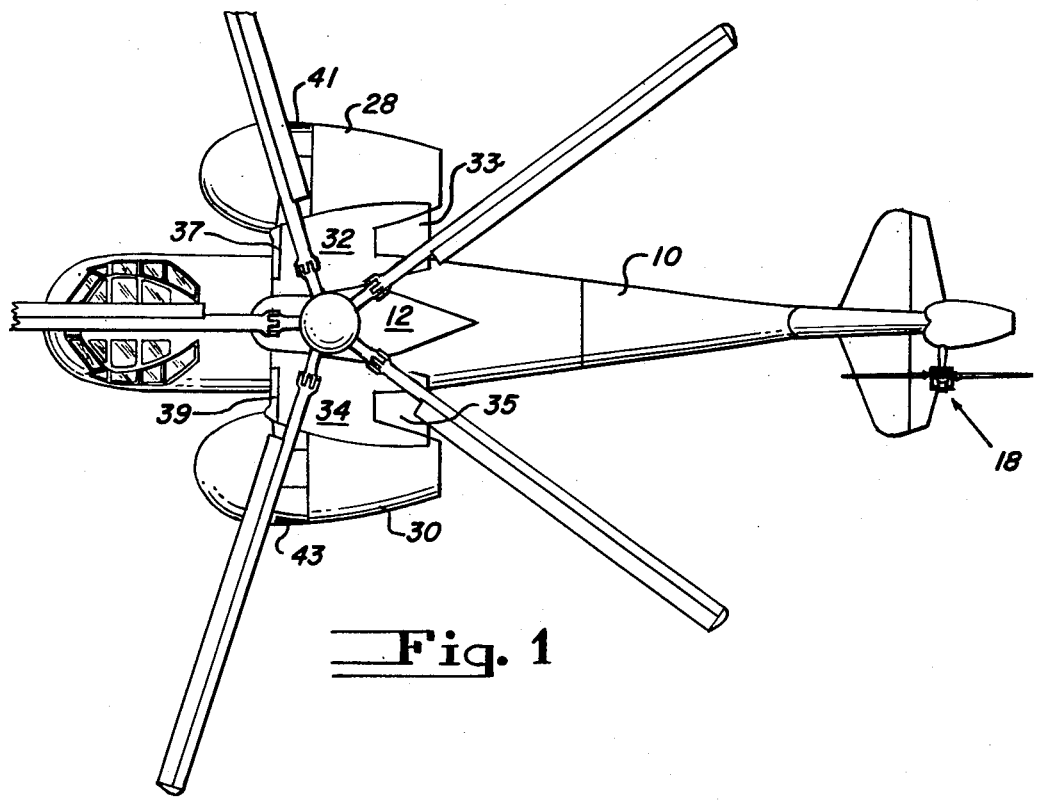
Fig. 1 is a plan view of a helicopter embodying the invention.
Figure 2:
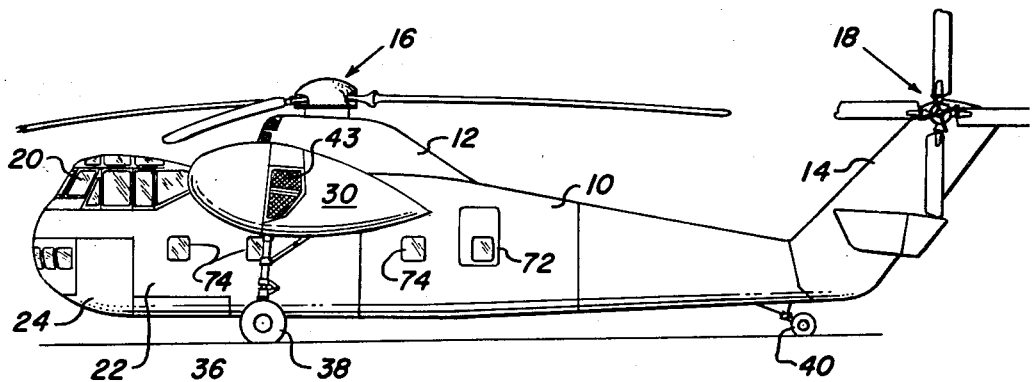
Fig. 2 is a side elevation of the helicopter of Fig. 1.
Figure 3:
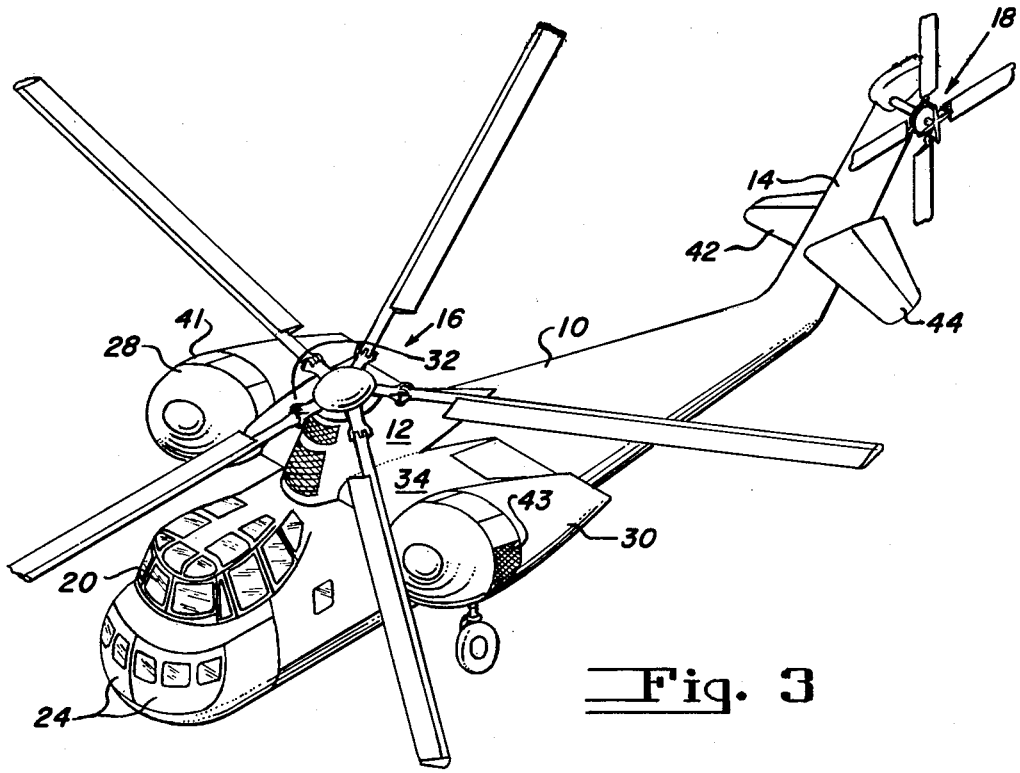
Fig. 3 is a perspective view of the helicopter.

The engines 26 (Fig. 6) of which two are provided, are mounted in engine nacelles 28 and 30 which are carried at the ends of short wings 32 and 34 and contain the engine exhaust ducts 41 and 43 as seen in Figs. 1 through 3. These wings project laterally from the upper portion of the fuselage in the vicinity of the main rotor pylon 12 and have their upper surfaces faired into this pylon. The wings are provided with trailing edge control surfaces 33 and 35, and contain the engine air intake ducts 37 and 39.

The ship is supported on the ground by a tricycle landing gear including main oleo struts 36 and wheels 38 which depend from the pylons 28 and 30 and by a tail wheel 40 depending from the fuselage just forward of the tail rotor cone 14. Stabilizer surfaces 42 and 44 extend outwardly and downwardly from the tail pylon 14.

The main rotor is shown herein as having five blades of the type which are pivotally connected to the rotor head or hub which is driven by an upright shaft 46 (Fig. 5) which extends through the pylon 12 from a gear box 48. The usual pilot's controls, collective pitch stick 50 and a cyclic pitch stick 52, are connected to the rotor blades through control linkage and the usual swashplate mechanism 54 for controlling the pitch of the blades.

It will be noted that the gear box 48 is located in a compartment 56 aft of the pilot compartment 20 and above the cargo compartment 22, the latter extending from the clamshell access doors 24 aft beneath the pilot compartment and the transmission compartment 56 to a bulkhead 58. Aft of this bulkhead a compartment 60 is provided which is connected with compartment 22 and comprises additional cargo space or, in the case of a passenger-carrying ship, comprises the baggage compartment.

As will be clear from Fig. 6, the engines 26 are disposed transversely to the longitudinal axes of the nacelles 28 and 30 and their drive shafts 62 extending directly upwardly and aft through the stub wings 32 and 34 into the gear box 48. Between the engines and their drive shafts 62, are located fluid clutches 63. From the gear box 48 a shaft 64 extends through the transmission compartment 56 and the tail cone of the fuselage to an angle gear box 66 from which a shaft 68 extends through the tail pylon 14 to drive the tail rotor 18 which as usual is rotated about a generally horizontal shaft 69.

The pilot compartment accommodates a pilot and a co-pilot and the usual instruments for flying the ship. Access to the pilot compartment is obtained through a hatchway 70 from the cargo compartment 22. From Fig. 2 it will be evident that the visibility from the pilot compartment is excellent. In addition to the clamshell doors in the nose of the fuselage, a door 72 is also provided at one side of the compartment 22 in place of one of the windows 74, this door being shown in Fig. 2.

It will be evident from the above that a helicopter has been provided having a main cargo or passenger compartment which extends from the nose of the fuselage aft through the entire usable space of the fuselage and that this compartment is wholly unobstructed by engine and transmission mechanism. It will also be evident that a large cargo or passenger compartment has been provided without sacrificing the safety of the ship since the pilot's compartment is located above this compartment where the pilots get a substantially unobstructed view in all directions.

It will also be clear that a fuselage has been provided which is especially advantageous for passenger use since much of the noise and vibration of the engines is isolated from the fuselage and the entire fuselage is available for the accommodation of the passengers.

At the same time the ship is particularly advantageous for cargo carrying use since the floor 78 of the cargo compartment 22 in the nose of the ship is pivoted at point 80 so that when the clamshell doors 24 are open and the floor 78 is dropped it forms a ramp enabling small vehicles to be driven directly into the cargo compartment.

While only one embodiment of the invention has been shown and described herein in considerable detail, it will be understood that the various changes in the construction and arrangement of the parts may be made without departing from the scope of the invention.

I claim:

1. In a helicopter, an elongated fuselage, a single main sustaining rotor having blades located above said fuselage, a gear box in the upper part of said fuselage having drive means connected to said rotor blades, aerodynamic sustentation members extending outwardly on opposite sides of said fuselage having their inboard ends at substantially the level of the said gear box, nacelles carried by said aerodynamic sustentation members, and an engine located within each nacelle, each of said engines having a drive shaft and power transmission means driving through said aerodynamic sustentation members and connecting said engine drive shafts with said gear box.

2. In a helicopter, an elongated fuselage, a single main sustaining rotor above said fuselage including a hub and blades mounted thereon, a gear box in the upper part of said fuselage under said rotor, rotor drive means between said gear box and said rotor, wings extending outwardly on opposite sides of said fuselage having their inboard ends at substantially the level of said gear box, nacelles carried by said wings and projecting forward of said wings, an engine located in each nacelle, drive means extended through said wings for connecting said engine drive shafts with said gear box, and a cargo compartment in said fuselage which extends well aft of said rotor hub and located beneath said gear box and said drive means.

3. In a helicopter, an elongated fuselage, a main sustaining rotor above said fuselage, a gear box in the upper portion of said fuselage and under said rotor, rotor drive means between said gear box and said rotor, aerodynamic sustentation members extending outwardly on opposite sides of said fuselage at substantially the level of said gear box, elongated nacelles carried by said aerodynamic sustentation members in the same planes as said aerodynamic sustentation members and having their longitudinal axes generally parallel with the longitudinal axis of said fuselage, engines located in said nacelles with their longitudinal axes disposed transversely to the longitudinal axes of said nacelles, said engines having drive shafts and drive means extending through said aerodynamic sustentation members and connecting said engine drive shafts with said gear box.

4. In a helicopter, an elongated fuselage having a cargo compartment extending well aft from its nose, front closure members for said compartment at the nose of said fuselage, a pilot compartment at the front of said fuselage above said cargo compartment, a pylon above said cargo compartment aft of said pilot compartment, a gear box in said pylon, a wing extended outwardly on each side of said fuselage, an elongated engine nacelle on each wing having its longitudinal axis parallel with the longitudinal axis of said fuselage, an engine in each nacelle having an axial shaft, a single main sustaining rotor above said pylon, drive means connecting said gear box with said rotor, and drive means connecting said engine shafts with said gear box, said engines having said drive means connected therewith extending upwardly through said wings into said gear box.

5. In a helicopter, a fuselage having a main cargo compartment, a single main sustaining rotor above said cargo compartment having a rotor drive shaft extending into said fuselage, a gear box at the lower end of said drive shaft and above said cargo compartment, a pair of aerodynamic sustentation members extending outwardly from said fuselage in the vicinity of said shaft from the level of said gear box, engine nacelles carried by said aerodynamic sustentation members on opposite sides of said fuselage having their longitudinal axes parallel with the longitudinal axis of said fuselage, engines in said nacelles located transversely of the longitudinal axes of said nacelles and having their driving shafts extended aft through said aerodynamic sustentation members into said fuselage and into said gear box, and a pilot's compartment forward of said nacelles beneath which said cargo compartment extends.

6. In a helicopter, a fuselage having a tail pylon carrying a tail rotor, a main cargo compartment in said fuselage extending from the nose of the fuselage aft toward said tail pylon, a main rotor pylon above said cargo compartment intermediate its ends, a gear box in said main rotor pylon having an upstanding main rotor drive shaft, a single main rotor driven by said shaft, a pair of wings extending outwardly from opposite sides of said fuselage in the vicinity of said main rotor pylon and from the level of said gear box, engine nacelles located on said wings and extending fore and aft relative thereto, an engine in each of said nacelles having a drive shaft and having its drive shaft extended obliquely through its wing into said gear box, a drive shaft extending from said gear box aft to said tail rotor above said cargo compartment, and a pilot's compartment in the nose of said fuselage above said cargo compartment and ahead of said main rotor pylon.

7. In a helicopter, a fuselage, a single main sustaining rotor above said fuselage including a rotor head having blades pivoted thereto, a main cargo compartment in the lower level of said fuselage extending aft from the nose of said fuselage throughout the usable space in said fuselage, a pilot compartment in the nose of said fuselage above said cargo compartment, a transmission compartment above said cargo compartment aft of said pilot compartment, said transmission compartment having a pylon extended above the rest of said fuselage, a gear box in said transmission compartment at said pylon having a rotor drive shaft extended upwardly and connected to said rotor head, a pair of aerodynamic sustentation members extending outwardly from said fuselage from the level of said transmission compartment, one on each side thereof having the interior thereof communicating with said transmission compartment, engine nacelles on said aerodynamic sustentation members having their longitudinal axes transverse to said aerodynamic sustentation members, engines in said nacelles having drive means extending through said aerodynamic sustentation members into said transmission compartment and into said gear box.

8. In a helicopter, a fuselage, a single main sustaining rotor above said fuselage including a rotor head having blades pivoted thereto, a main cargo compartment in the lower level of said fuselage extending aft from the nose of said fuselage throughout the usable space in said fuselage, a pilot compartment in the nose of said fuselage above said cargo compartment, a transmission compartment above said cargo compartment aft of said pilot compartment, said transmission compartment having a pylon extended above the rest of said fuselage, a gear box in said transmission compartment at said pylon having a rotor drive shaft extended upwardly and connected to said rotor head, a pair of wings extending outwardly from said fuselage from the level of said transmission compartment, one on each side of said fuselage, an engine nacelle on each wing having its longitudinal axis extending fore and aft across said wing, said nacelles projecting forward of said wings, engines in said nacelles having the aft extensions of their axes of revolution converging at said gear box, and drive shafts extending aft obliquely from said engines through said wings and into said gear box.

9. In a helicopter, an elongated fuselage, a main sustaining rotor above said fuselage, a main cargo compartment in the lower level of said fuselage which extends from the nose of said fuselage aft throughout the usable space in said fuselage beneath said rotor, a pilot compartment above said cargo compartment in the nose of said fuselage, access doors in the nose of said fuselage beneath said pilot compartment opening into said cargo compartment, a passageway from said cargo compartment to said pilot compartment, and a transmission compartment above said cargo compartment aft of said pilot compartment, a pylon upstanding from said transmission compartment, a gear box in said latter compartment in the vicinity of said pylon, wings on opposite sides of said fuselage having their interior communicating with said transmission compartment in the vicinity of said pylon, engine nacelles on said wings projecting forward of said wings, engines in the forward projection of said nacelles, and drive shafts extended through said wings from said engines and connected with said gear box, and a rotor drive shaft extended upwardly from said gear box and connected to said rotor.

10. In a helicopter, an elongated fuselage, a single main sustaining rotor above said fuselage including a hub and blades mounted thereon, a gear box in the upper part of said fuselage under said rotor, rotor drive means between said gear box and said rotor, short wings extending outwardly on opposite sides of said fuselage having their inboard ends at substantially the level of said gear box, a nacelle carried by each wing, each nacelle being fixed to the end of its wing and projecting forward thereof, an engine located in each nacelle transverse to the longitudinal axis thereof, said short wings each having a movable control surface located thereon, each short wing having an engine air intake duct with its inlet located on the leading edge thereof, each of said nacelles having an engine exhaust duct opening on the side thereof, drive means extended through said short wings for connecting said engine drive shafts with said gear box, and a cargo compartment in said fuselage which extends well aft of said rotor hub and located beneath said gear box and said drive means.

References Cited in the file of this patent

UNITED STATES PATENTS

| | | |
|---|---|---|
| 1,980,980 | Campbell | Nov. 20, 1934 |
| 2,464,726 | Stalker | Mar. 15, 1949 |
| 2,529,033 | Linville | Nov. 7, 1950 |
| 2,600,930 | Sikorsky | June 17, 1953 |
| 2,665,859 | Papadakos | Jan. 12, 1954 |

OTHER REFERENCES

"Aviation Week" Issue of October 1, 1951; page 16.
"Flight" Magazine, March 7, 1946, pages 235–239—"Freighter and Wayfarer."